United States Patent [19]

Furcsik et al.

[11] Patent Number: 5,260,076
[45] Date of Patent: Nov. 9, 1993

[54] PIZZA CRUST

[75] Inventors: Susan Furcsik, Lake Station; Carol Stankus, Whiting, both of Ind.

[73] Assignee: American Maize-Products Company, Stamford, Conn.

[21] Appl. No.: 11,277

[22] Filed: Jan. 29, 1993

[51] Int. Cl.⁵ ............................................. A21D 2/36
[52] U.S. Cl. ....................................... 426/21; 426/549
[58] Field of Search ................................... 426/21, 549

[56] References Cited

U.S. PATENT DOCUMENTS

| | | | |
|---|---|---|---|
| 4,774,328 | 9/1988 | Freedman et al. | 426/578 X |
| 4,789,557 | 12/1988 | Friedman et al. | 426/589 X |
| 4,789,758 | 12/1988 | Freidman et al. | 426/578 X |
| 4,790,997 | 12/1988 | Friedman et al. | 426/578 |
| 4,792,458 | 12/1988 | Friedman et al. | 426/578 |

*Primary Examiner*—Joseph Golian
*Attorney, Agent, or Firm*—Lucas & Just

[57] ABSTRACT

The improved pizza crust is made by incorporating an effective amount of a novel starch obtained from a plant having a genotype selected from the group consisting of amylose extender dull, dull horny, dull sugary-2, and dull waxy. The amount of novel starch added to the dough is 1 to 15 parts by weight based on parts by weight flour. Improved freezer resistance is provided to the crust by incorporating the novel starch.

13 Claims, No Drawings

PIZZA CRUST

This invention relates to pizza crust and, more particularly, to a dough formulation which provides good freezer resistance to the crust made from the dough.

Pizza is an open pie made by forming an open pie shell into which is spread a spiced mixture, e.g. tomato sauce, cheese and meat. Typically, the dough comprises flour, water and yeast. Pizza is often prepared by industrial food manufacturers and then frozen for sale to consumers. In order to consume the frozen pie, the consumer merely heats the pie in an oven. There is a need for the pizza crust to have good freezer resistance. Freezer resistance means the ability of the crust to withstand both the egress and ingress of moisture while the pie is in a frozen state. This movement of moisture can cause the crust to either become soggy due to the ingress of water or hard and dry due to the egress of water.

It has now been discovered that by using an effective amount of a novel starch obtained from a plant having a genotype selected from the group consisting of amylose extender dull, dull horny, dull sugary-2 and dull waxy in the dough that the resulting pizza crust has improved freezer resistance. More specifically, in order to improve the freezer resistance of a pizza crust, the pizza crust is made from a dough which comprises water, flour, yeast and an effective amount of one or more of said novel starches.

The amount of novel starch used in the dough formulation is effective to improve the freezer resistance of the crust. More preferably, the amount of novel starch used in the dough is about 1 part to about 15 parts by weight based on 100 parts by weight of flour. Even more preferred, the amount of novel starch used in the dough is about 2 parts to about 10 parts by weight per 100 parts by weight of flour; and most preferred, the amount of novel starch added to the dough is about 5 parts by weight based on 100 parts by weight flour.

The proportions of the other components used in the present invention are maintained in accordance with conventional formulations or slightly adjusted due to the addition of the novel starches as taught herein.

Additional water is preferably added to the dough when the novel starch is in granular form. The amount of additional water added depends on the workability of the dough and one of skill in the art can determine the amount of additional water needed for the dough. Preferably, the amount of additional water added to the dough is about 20 parts to about 80 parts by weight based on 100 parts by weight novel starch. More preferably, the amount of additional water added to the dough is about 25 parts to about 75 parts by weight based on 100 parts of novel starch.

All purpose wheat flour has been found to work well in the present invention; however, any flour along with mixtures of different flours such as wheat, rye, corn, rice, etc. may be used.

The term "starch" as used in the specification and claims means not only the substantially pure starch granules as extracted from a starch-bearing plant but also grain products of the starch granule such as flour, grit, hominy, and meal, so long as these starches have not been chemically modified or treated to substantially alter the makeup of the anhydroglucose monomeric units or the polymeric structure of the starch. Preferably, the starch used in the present invention is in the granular form, without any physical or chemical modification.

The terms "amylose extender dull" or "aedu" genotype as used in the specification and claims mean not only the aedu homozygous genotype, aeaedudu, which has been obtained by standard plant breeding techniques, but also the aedu genotype which has been moved to another portion of the plant genome by translocation, inversion, or any other method of chromosome engineering to include variations thereof whereby the disclosed properties of the starch used in the present invention are obtained.

The terms "dull horny" or "duh" genotype as used in the specification and claims mean not only the duh homozygous genotype, duduhh, which has been obtained by standard plant breeding techniques, but also the duh genotype which has been moved to another portion of the plant genome by translocation, inversion, or any other method of chromosome engineering to include variations thereof whereby the disclosed properties of the starch used in the present invention are obtained.

The terms "dull sugary-2" or "dusu2" genotype as used in the specification and claims mean not only the dusu2 homozygous genotype, dudusu2su2, which has been obtained by standard plant breeding techniques, but also the dusu2 genotype which has been moved to another portion of the plant genome by translocation, inversion, or any other method of chromosome engineering to include variations thereof whereby the disclosed properties of the starch used in the present invention are obtained.

The term "dull waxy" or "duwx" genotype as used in the specification and claims means not only the duwx homozygous genotype, duduwxwx, which has been obtained by standard plant breeding techniques, but also the duwx genotype which has been moved to another portion of the plant genome by translocation, inversion, or other methods of chromosome engineering to include variations thereof whereby the disclosed properties of the starch used in the present invention are obtained.

The terms "aedu starch", "duh starch", "dusu2 starch", and "duwx starch" as used in the specification and claims mean starches obtained respectively from starch-bearing plants which are of the aedu, duh, dusu2, and duwx genotypes.

U.S. Pat. Nos. 4,774,328 issued Sep. 27, 1988; 4,790,997 issued Dec. 13, 1988; 4,789,557 issued Dec. 6, 1988; and U.S. Pat. No. 4,792,458 issued Dec. 20, 1988 disclose, respectively, the duh, aedu, duwx, and dusu2 starches and their use in foodstuffs. These patents are incorporated herein by reference.

Any plant source which produces edible starch and which can be crossbred to produce a plant having an aedu, a duh, a dusu2 or a duwx genotype may be used to obtain the starches which are used in accordance with the present invention. It has been found that the amylose extender (ae) gene is present in maize and barley, and that cereal grains such as maize contain the dull (du), horny (h), sugary-2 (su2), and waxy (wx) genotypes. Maize is the preferred plant source for the starches used in the present invention.

In order to make a pizza crust in accordance with the present invention, all of the dry components are first mixed together, e.g. flour, novel starch, sugar, and salt. Yeast is mixed into warm water and added along with the water subsequent to the addition of the shortening.

A conventional method with conventional equipment is employed to make the pizza dough and bake the pizza crust.

Although it is proposed that the use of the novel starches in accordance with the present invention is in a pizza which is premade, frozen and sold in stores to consumers for reheating and consumption, the novel starches of the present invention can also be used in frozen pizza dough which is sold to consumers or restaurants.

These and other aspects of the present invention may be more fully understood by reference to the following examples.

EXAMPLE 1

The following illustrates the use of an aedu starch in a pizza crust formulation. The following ingredients were used to make the pizza dough:

| Ingredient | Amount (grams) |
|---|---|
| Flour, all purpose | 1525.25 |
| Water 80° F. (27° C.) | 896.00 |
| Yeast, dry active | 20.50 |
| Sugar | 9.50 |
| Salt | 23.75 |
| Shortening | 25.00 |
| Novel starch, aedu granular | 72.26 |
| Additional water | 37.41 |

The dough and crust were prepared by combining 100 grams of 80° F. (27° C.) water with the dry active yeast and then allowing this slurry to sit for 20 minutes while the remaining ingredients were mixed. First the dry ingredients of flour, aedu starch, and sugar were mixed and then the shortening was mixed into the dry ingredients. To this mix the remaining water, along with the yeast slurry and additional water was added. The dough was then put aside and allowed to rise to double its size. After rising, the dough was cut and formed into flat open pie shells. About 280 grams of dough was used for each crust. The open pie shells were then cooked in a convection oven at 425° F. (220° C.) for about 15 to 20 minutes until the crust was golden brown. The cooked crust was then removed from the oven, allowed to cool and 120 grams of pizza sauce was placed on the top of the cooled crust. The following formulation was used for the pizza sauce:

| Ingredients | Amount (% by weight) |
|---|---|
| Tomato puree | 55.19 |
| Water | 37.04 |
| Sugar | 4.27 |
| Starch (modified duwx starch) | 1.46 |
| Salt | 0.95 |
| Fresh whole oregano | 0.23 |
| Fresh whole basil | 0.16 |
| Garlic powder | 0.15 |
| Fresh whole thyme | 0.10 |
| Toasted dried chopped onion | 0.14 |
| Black pepper | 0.09 |
| Parmesan/Romano cheese flavor | 0.22 |

The sauce was made by combining all the ingredients and cooking them for a short period of time in a jacketed kettle. On the top of the sauce-covered crust, 120 grams of shredded low fat, Italian cheese blend was added. The finished pie was then frozen (0° C.).

To provide a comparison, a conventional pizza pie formulation was made using the dough and sauce formulation above except no novel starch or additional water was added to the dough.

A taste panel of seven persons tested both crusts, conventional and present invention, after one day of frozen storage. In order to reheat the frozen pies, they were placed in a convection oven for 12 minutes at 400° F. (205° C.). The taste panel found that the control pie had a wet layer directly under the sauce and that the bottom crust of the control was hard, dry and crunchy. The pie made in accordance with the present invention had no wet layer and was only slightly dry. Overall, the taste panel found the pie crust made in accordance with the present invention was better than the control pie.

After 32 days of frozen storage, a taste panel of eight was assembled and the frozen pies reheated in the same manner as before, 12 minutes at 400° F. (205° C.). This time the panel found the crust of the control pie to be very doughy and wet under the sauce. The crust of the control was found to be chewy and tough by the taste panel. In contrast, the crust made in accordance with the present invention was not as soggy or doughy as the control pie and was not as tough as the control pie.

Overall, the crust of the present invention was found to be superior to the control. The panel found that the crust made in accordance with the present invention was somewhat bread-like in consistency with a crispy bottom crust.

EXAMPLE 2

This example illustrates using a duh starch in a pizza crust formulation.

A pizza pie was made in accordance with Example 1 and frozen; however, the amount of additional water used in the dough was 44.98 grams and 72.26 grams of a granular duh starch was employed rather than aedu starch.

After one day of frozen storage, the pie was heated as in Example 1, 12 minutes at 400° F. (205° C.), and evaluated by a taste panel of seven people along with the control. The panel found that the pie using duh starch was bread-like in appearance, i.e. more volume, and that the bottom of the crust was crunchy. The panel found that the crust was not as soggy as the control pie.

After 32 days of frozen storage, the pie was heated, as above, and the taste panel of eight tested the pie along with the control. It was found that the crust using duh starch was less soggy than the control, and had a bread-like consistency.

Overall, the taste panel found crust made with duh starch to be superior to the control crust.

EXAMPLE 3

This example illustrates using a dusu2 starch in a pizza crust formulation.

A pizza pie was made in accordance with Example 1 and frozen; however, the amount of additional water used in the dough was 39.33 grams and 72.26 grams of a granular dusu2 starch was used instead of aedu starch.

After one day of frozen storage, the pie was heated as in Example 1, 12 minutes at 400° F. (205° C.), and evaluated by the taste panel of seven people along with the control. The panel found that the pie using dusu2 starch was bread-like in appearance, i.e. more volume, and the top of the crust, next to the sauce, was wet.

After 32 days of frozen storage, the pie was heated, as above, and the taste panel of eight tested it along with the control. It was found that the crust using dusu2 starch was less soggy than the control, and had a bread-like consistency.

Overall, the taste panel found the crust made with dusu2 starch to be superior to the control crust.

EXAMPLE 4

This example illustrates using a duwx starch in a pizza crust formulation.

A pizza pie was made in accordance with Example 1 and frozen; however, the amount of additional water used in the dough was 53.83 grams and 72.26 grams of a granular duwx starch was used instead of aedu starch.

After one day of frozen storage, the pie was heated as in Example 1, 12 minutes at 400° F. (205° C.), and evaluated by the taste panel of seven people against the control pie. The panel found that the pie using duwx starch was bread-like in appearance, i.e. more volume, and that the bottom of the crust was crunchy. The panel found that the crust was not as soggy as the control crust.

After 32 days of frozen storage, the pie was heated, as above, and the taste panel of eight tested it against the control. It was found that the crust using duwx starch was not soggy like the control, had a bread-like consistency, and the bottom crust was crunchy.

Overall, the crust made with duwx starch was found to be superior to the control crust and was rated the best of all the crusts tested herein.

EXAMPLE 5

This example illustrates heating a frozen pizza having a dough made in accordance with the present invention in a microwave oven.

Three pizza doughs were prepared in accordance with the present invention; a dough containing aedu starch and made in accordance with Example 1; a dough containing duh starch and made in accordance with Example 2; a dough containing duwx starch and made in accordance with Example 4. For comparative purposes, two other conventional doughs were prepared; a control dough containing only flour and made in accordance with Example 1; and a dough containing 72.26 grams of a conventional high amylose starch instead of the novel starch of the present invention, and 37.41 grams of additional water. In order to make the dough with conventional high amylose starch, the procedure of Example 1 was used except conventional high amylose starch was used in place of the aedu starch. The conventional high amylose starch was AMAIZO 5 which was commercially available from American Maize-Products Company.

For each of these dough formulations, 36.5 grams of dough was used to make a pizza crust in accordance with Example 1. To these crusts 17.0 grams of pizza sauce made in accordance with Example 1 and 36.5 grams of shredded low fat, Italian cheese blend were added. These five pizzas were then frozen in accordance with Example 1 and removed from frozen storage after seven days.

In order to reheat the frozen pizzas in a microwave oven, a susceptor was used and the microwave oven was set on high (750 watts). The pizzas were then individually heated for approximately 1.5 minutes in the microwave oven.

A taste panel of four panelists then evaluated each of the pizzas. Focusing on the pizza crust itself, the overall comments from the panel were as follows:

Control Dough had a tough texture, it was wet, bready and stale.

duwx: Crust was tougher than duh but not as tough as the control. The crust was bready with a hard bottom.

aedu: The crust was like a cracker crust on the bottom. It was not as crunchy as the crust made with AMAIZO 5 The crust was doughy and semi-bready.

duh: The crust had good texture and overall this sample was the best of the five crusts.

AMAIZO 5: The crust was tight, crunchy and hard. The texture of the crust was not wet; rather, it was a cracker-type crust.

It will be understood that the claims are intended to cover all changes and modifications of the preferred embodiments of the invention herein chosen for the purpose of illustration which do not constitute a departure from the spirit and scope of the invention.

What is claimed is:

1. An improved pizza crust made from a dough comprising flour, yeast and water wherein the improvement comprises adding an effective amount of a novel starch obtained from a plant having a genotype selected from the group consisting of amylose extender dull, dull horny, dull sugary-2 and dull waxy, the amount being effective to improve the freezer resistance of the dough.

2. The crust of claim 1 wherein said novel starch is obtained from maize.

3. The crust of claim 1 wherein said novel starch is in granular form.

4. The crust of claim 1 wherein said novel starch is present in said dough in an amount of about 1 part to about 15 parts by weight based on 100 parts by weight flour.

5. The crust of claim 1 wherein said novel starch is present in said dough in an amount of about 2 parts to about 10 parts by weight based on 100 parts by weight flour.

6. The crust of claim 1 wherein said novel starch is present in said dough in an amount of about 5 parts by weight based on 100 parts by weight flour.

7. A method for improving the freezer resistance of a pizza crust, comprising the steps of:
(a) forming a dough comprising flour, yeast, water and an effective amount of a novel starch obtained from a plant having a genotype selected from the group consisting of amylose extender dull, dull horny, dull sugary-2 and dull waxy, the amount being effective to improve the freezer resistance of the pizza crust; and
(b) shaping and baking said dough into a pizza crust.

8. The method of claim 7 wherein additional water in an amount of about 20 to about 80 parts by weight based on 100 parts by weight of novel starch is added to the dough.

9. The method of claim 7 wherein said novel starch is obtained from maize.

10. The method of claim 7 wherein said novel starch is in granular form.

11. The method of claim 7 wherein said novel starch is present in said dough in an amount of about 1 part to about 15 parts by weight based on 100 parts by weight flour.

12. The method of claim 7 wherein said novel starch is present in said dough in an amount of about 2 parts to about 10 parts by weight based on 100 parts by weight flour.

13. The method of claim 7 wherein said novel starch is present in said dough in an amount of about 5 parts by weight based on 100 parts by weight flour.

* * * * *